Oct. 10, 1944.   W. J. MOSER   2,360,149
FLEXIBLE COUPLING
Filed Jan. 5, 1943

INVENTOR.
WERNER J. MOSER
BY
C. P. Goepel
ATTORNEY

Patented Oct. 10, 1944

2,360,149

UNITED STATES PATENT OFFICE 2,360,149

FLEXIBLE COUPLING

Werner J. Moser, McMasterville-Beloeil, Quebec, Canada

Application January 5, 1943, Serial No. 471,332

3 Claims. (Cl. 64—11)

This invention relates to flexible couplings, and more particularly to an improvement therein which has for its object to provide a simpler and better coupling than heretofore proposed.

The invention consists in the combination of two parallel discs disposed opposite to each other each disc being secured to a shaft and the discs being joined by coupling members which extend from the periphery of the discs radially inwards substantially to the axis thereof.

The improvement consists in the extended coupling members beginning at the axis, or as near thereto as is practical, and terminating substantially at the periphery of the discs. These coupling members are substantially rectangular in cross section and of the same cross sectional area throughout, and the grooves for the coupling members extending from a disc have the same configuration as the extending portions. Such coupling members may be placed either in straight or curved grooves.

The invention consists further in combining means with a coupling of this kind for preventing the coupling members from being thrown out by centrifugal force during the rotation of the discs.

The invention will be more fully described hereinafter, embodiments thereof will be shown in the drawing, and the invention will be finally pointed out in the claims.

In the accompanying drawing—

Similar characters of reference indicate corresponding parts throughout the various views.

Figure 4:
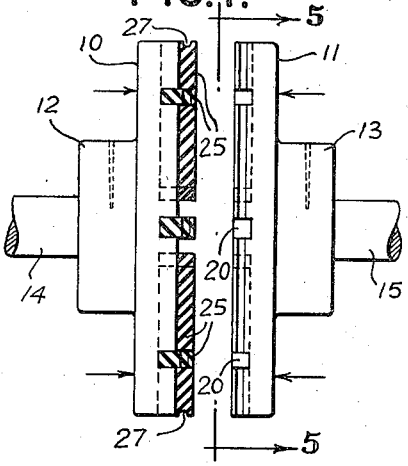
Fig. 4 shows a top or side view with the coupling discs separated from each other.

Referring to the drawing, and more particularly to Fig. 4, the two coupling discs 10 and 11 are spaced from each other; each disc has a hub 12 and 13, respectively, and each hub is secured to a shaft end 14 or 15. Preferably one of these hubs, as for instance 12, is fixedly secured to the shaft 14, and the other hub 13 is secured against rotation on the shaft 15 by means of some suitable device, as for instance a key 16 entering a slot of the shaft. This arrangement permits the hub with its disc 11 to slide longitudinally on the shaft 15, but prevents the hub 13 and disc 11 from rotating in respect to the shaft 15. Mechanism of this kind is well known.

Figure 3:
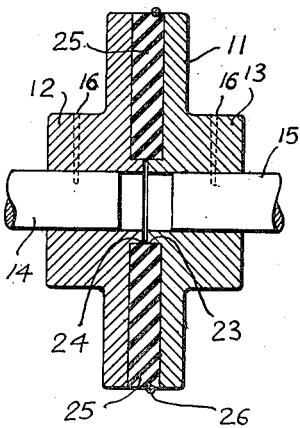
Fig. 3 shows a vertical central section taken on line 3—3 of Fig. 1.
Figure 5:
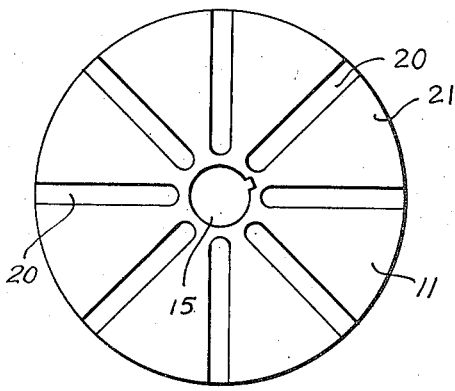
Fig. 5 is a view of one coupling disc taken from line 5—5 of Fig. 4.

The improvement forming the basis of this invention consists in providing the opposite faces of the two discs 10 and 11 with grooves 20 which extend from the periphery 21 of each disc as near to the axis of each disc, the grooves extending as far as possible towards this axis 22 as the diameter of the shaft 15 permits. The opposed faces of the disc are $\frac{1}{16}''$ apart. The inserted couplings should not have a slack fitting. The grooves 20 of the disc 11 have a certain depth indicated by 23 of Fig. 3 which depth is about one-half of the thickness of the coupling member to be inserted into the groove; the other disc 10 has grooves exactly like those just described of the disc 11, the depth of which grooves indicated by 24 in Fig. 3 being substantially the same as the depth 23 of the disc 11 and this depth 24 being about one-half of the thickness of the coupling member. The disc 10 again has its grooves extending from the periphery of the disc as far inwardly as permissible by the shaft. In both discs a large number of grooves are provided. Eight are shown in the drawing, Fig. 5, though the grooves may be from 4 to 15 in number, in which latter case the inwards ends of the grooves are so close together as to prevent any further groove of the same width from being utilized. It will be noted that the inner portions of the grooves 20 are curved or rounded in the form of a semi-circle and the center of curvature of these rounded ends are of a circle with the axis 22 as a center, and in the case of a number of grooves such as 15, the side portions of the semi-circles almost touch each other. When the number of grooves are increased from 15 to about 36, then the inner ends of the grooves are on concentric circles.

Figure 1:
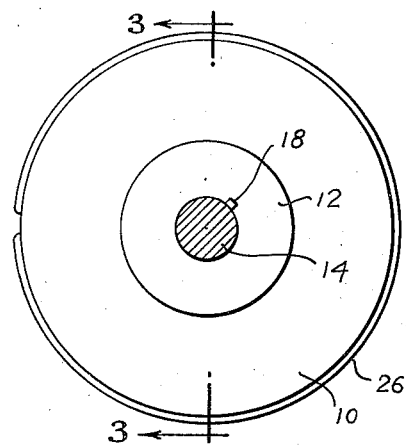
Fig. 1 shows a side view of the improved coupling.
Figure 2:
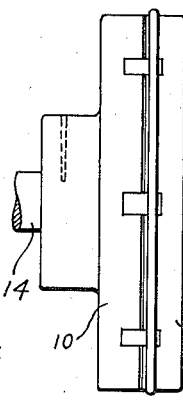
Fig. 2 shows a plan view or a side view of the same.
Figure 6:
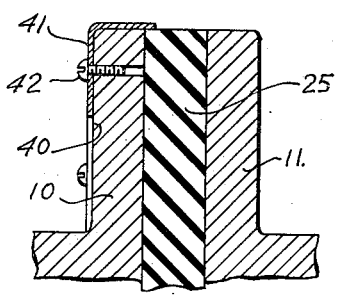
Fig. 6 is a detailed view showing a different form of holding device.
Figure 7:
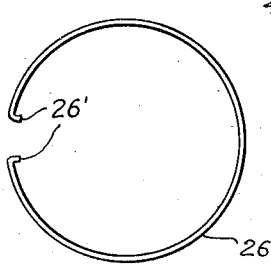
Fig. 7 is a detailed view, showing the form of holding device shown in Fig. 1.

With the two discs 10 and 11 formed in the manner described with the grooves extending from the periphery as far inwardly as possible, and preferably with the largest number of grooves possible, and with the depth of each groove about one-half the thickness of the coupling member, coupling members 25 of compact rubber belting or the like are slidably inserted into the registering grooves of the two discs and thus form a connection between the two discs. These coupling members are rectangular in cross section and of the same cross sectional area throughout, so that substantially all of the coupling member parts which project beyond the disc register with the grooves. To hold these coupling members in registering grooves a suitable retaining or a suitable binding member may be provided, as shown in Fig. 6. A device of the kind shown in Fig. 6 may be readily applied and readily taken off and serves to securely hold the coupling members in position. One form of holding member is shown in Fig. 1, and is shown separately in Fig. 7 in side view. The ends of the member 26 are bent inwardly as at 26 to engage the walls of a groove at the periphery of the disc, the member 26 resting in peripheral grooves 27. In Fig. 6 another form is shown. One disc 10 has a portion 40 onto which an angular rim portion 41 is seated which is secured to the disc by means of the threaded screw 42, the rim 41 extending over at least a part of the coupling member 25.

Figure 8:
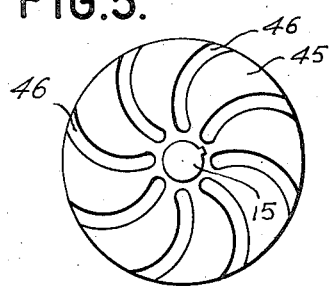
Fig. 8 is an end view of a disc of modified form in which the coupling members are curved.

In Fig. 8, the disc 45 has grooves 46 which are curved and extend from the periphery of the disc close to the shaft 15. Here, the holding ring is not necessary.

It will be seen that the herein important improvement made is the cooperation of the multiplicity of demi-grooves in each of the opposed faces of the coupling discs with the coupling members, which grooves have a depth of about one-half of the coupling member to be inserted into the registering grooves and which grooves extend from the peripheral portion of the discs inwardly as far as possible.

The advantages of this improved flexible coupling is its simple design—its low price compared with its capacity. The coupling will not wear out, and no spare parts have to be purchased, since any user of this coupling has the spare parts right in his own plant. Almost anything can be used as intermediate parts—besides rubber belting, such as fibre, good hardwood, leather etc. Rubber or leather belting is preferred. Another advantage lies in the fact that intermediate coupling members can be changed in a short time, without moving either one or both parts of coupling, nor the motor or machine. The discs can be made of plastic or other suitable material and from 4 to about 36 grooves. Spring rings are applied to hold strips in place up to a revolution of 800 R. P. M. and for higher speed a cap protection or angular retaining ring is arranged which can easily be attached and removed. This coupling will absorb all vibration, and the bearings of the driver and the driven members of the machine will remain cool.

The improved coupling is constructed with a solid back and grooves, machined from the outside edge of each half as far as the bore for the shaft. With this coupling there is never any danger of breakage in spite of the fact that the number of grooves is only limited by the area of the face of the coupling halves. This coupling can take as many grooves as possible without impairing the strength of the coupling in any way or form. As a matter of fact, it would be possible to machine more grooves (shorter ones of course) between the present grooves without impairing the strength of the coupling. Having the grooves cut as long as possible, they will be filled with a flexible link its entire length, in this way permitting a coupling that can transmit more H. P. than may be expected, as all vibration and strain on driver and driven members is eliminated.

I have described several forms of my invention, but obviously various changes may be made in the details disclosed without departing from the spirit of the invention as set out in the following claims.

What I claim is:

1. In a flexible coupling, the combination of a disc having curved grooves, a shaft fixed to said disc for rotation therewith, a second disc having curved grooves facing the curved grooves of the first-named disc, a second shaft connected with said second disc, for rotation therewith, and coupling members in the curved grooves of one disc adapted to engage the curved grooves of the other disc upon the grooved faces of the discs being brought into contiguity, the curved grooves and coupling members being radially disposed and extending from the periphery of the discs to the central part thereof.

2. In a flexible coupling having parallel discs each having grooves therein extending radially from the peripheries of said discs and registering with each other, the grooved adjacent faces of the discs being contiguous to each other, the combination of two such opposed discs having opposed surfaces substantially in contact with each other each having its grooves extending from the periphery of the discs towards and terminating proximate the center thereof, said registering grooves having the same depth throughout and being rectangular in cross-section and having their inward ends proximate with each other and having throughout the same cross-sectional area, and separate solid coupling members of rectangular shape and inserted in said grooves and extending outwardly from the face of the disc of a length, width and depth of the opposed registering grooves having throughout the same cross-sectional area.

3. In a flexible coupling, the combination of a disc having grooves, a shaft fixed to said disc for rotation therewith, a second disc facing the grooves of the first-named disc, all of said grooves being rectangular in cross-section and of the same depth throughout a second shaft connected with said second disc for rotation therewith, and separate solid coupling members on said second disc projecting from the second disc adapted to engage the grooves of the other disc upon the faces of the discs being brought into contiguity, the grooves and coupling members being radially disposed and extending from the periphery of the discs proximate to the central part thereof and terminating proximate to the central part thereof and being at least eight in number, the faces of the discs being substantially in contact with each other the inward terminations of the grooves and coupling members being so close as to be almost in contact with each other, the said grooves having throughout the same cross-sectional area, said solid coupling members extending from the face of the disc the length, width and depth of the opposed registering grooves and filling the same, the said grooves having throughout the same cross-sectional area.

WERNER J. MOSER.